United States Patent
Ku

(10) Patent No.: US 6,786,278 B2
(45) Date of Patent: Sep. 7, 2004

(54) COMPACT AIR CONDITIONER FOR AUTOMOBILES

(75) Inventor: Nam Mo Ku, Taejon-Si (KR)

(73) Assignee: Halla Climate Control Corp. (KR)

( * ) Notice: Subject to any disclaimer, the term of this patent is extended or adjusted under 35 U.S.C. 154(b) by 0 days.

(21) Appl. No.: 09/886,534

(22) Filed: Jun. 20, 2001

(65) Prior Publication Data

US 2002/0000313 A1 Jan. 3, 2002

(30) Foreign Application Priority Data

Jun. 23, 2000 (KR) .......................................... 2000-34725

(51) Int. Cl.[7] .............................................. B60H 1/00
(52) U.S. Cl. ......................... 165/204; 165/202; 165/42
(58) Field of Search .................................. 165/201, 202, 165/203, 42, 43

(56) References Cited

U.S. PATENT DOCUMENTS

| | | | | | |
|---|---|---|---|---|---|
| 4,940,083 A | * | 7/1990 | Takenaka et al. | ............... | 165/42 |
| 5,619,862 A | * | 4/1997 | Ruger et al. | ............ | 165/202 X |
| 5,803,160 A | * | 9/1998 | Danieau | ...................... | 165/42 |
| 5,836,380 A | * | 11/1998 | Takesita et al. | ........... | 165/42 X |
| 5,878,806 A | * | 3/1999 | Denk et al. | .................... | 165/42 |
| 5,950,711 A | * | 9/1999 | Bendell | ........................ | 165/42 |
| 5,954,578 A | * | 9/1999 | Takasaki | .................... | 165/42 X |
| 5,983,987 A | * | 11/1999 | Weindorf | .................... | 165/43 X |
| 5,988,518 A | * | 11/1999 | Kawai et al. | ............ | 165/202 X |
| 6,032,723 A | | 3/2000 | Tsuihiji et al. | | |
| 6,045,444 A | * | 4/2000 | Zima et al. | ................ | 165/42 X |
| 6,062,298 A | * | 5/2000 | Lee | ............................... | 165/42 |
| 6,135,201 A | * | 10/2000 | Nonoyama et al. | ........ | 165/43 X |
| 6,311,763 B1 | * | 11/2001 | Uemura et al. | ................ | 165/43 |
| 6,382,305 B1 | * | 5/2002 | Sano | ........................... | 165/43 |
| 6,415,856 B1 | * | 7/2002 | Gilles | ......................... | 165/203 |
| 6,415,857 B1 | * | 7/2002 | Nakamura et al. | ......... | 165/42 X |
| 6,425,437 B2 | * | 7/2002 | Schmadl et al. | ............... | 165/42 |
| 6,427,760 B2 | * | 8/2002 | Klinger et al. | ................ | 165/42 |
| 6,431,257 B1 | * | 8/2002 | Sano et al. | .................... | 165/42 |
| 6,453,991 B1 | * | 9/2002 | Tsurushima et al. | ........ | 165/202 |
| 6,460,607 B1 | * | 10/2002 | Shibata | ........................ | 165/42 |
| 6,474,406 B2 | * | 11/2002 | Sano et al. | .................... | 165/42 |
| 6,568,468 B1 | * | 5/2003 | Uemura et al. | ........... | 165/42 X |

FOREIGN PATENT DOCUMENTS

| | | | | |
|---|---|---|---|---|
| DE | 100 15 972 A1 | * 10/2001 | ................... | 165/43 |
| JP | 57-130815 | * 8/1982 | ................... | 165/43 |
| JP | 09-123748 | 5/1997 | | |
| JP | 10-147130 | 6/1998 | | |

* cited by examiner

Primary Examiner—Ljiljana Ciric
(74) Attorney, Agent, or Firm—Lowe Hauptman Gilman & Berner LLP

(57) ABSTRACT

An air conditioner includes an evaporator and a heater core. A first partition is positioned between the evaporator and the heater core, and provided with a first blowing opening for allowing air to detour the heater core and a second blowing opening for blowing air to the heater core. A temperature regulating door is supported on sidewalls of the air conditioner housing by two side support arms. A heater chamber containing the heater core is open at its bottom and communicates with the second blowing opening. A pair of side blowing passages communicate the heater chamber and a mixing chamber.

6 Claims, 6 Drawing Sheets

COMPACT AIR CONDITIONER FOR AUTOMOBILES

BACKGROUND OF THE INVENTION

1. Field of the Invention

The present invention relates generally to compact air conditioners for automobiles, and more particularly to a compact air conditioner for automobiles, which is capable of reducing its installation space, facilitating the connection of its refrigerant supply conduit to its heater core, and improving its performance.

2. Description of the Prior Art

Air conditioners for automobiles each include a cooling unit and a heating unit. The cooling unit cools the interior of an automobile by discharging into the interior of the automobile cool air that is produced by heat exchange between air blown by a cooling fan and refrigerant passing through an evaporator, during a process in which refrigerant is compressed by a compressor operated by the power of an engine, transmitted to an condenser, condensed in the condenser by the forcible blowing of the refrigerant fan, passes through a receiver dryer, an expansion valve and the evaporator, and is returned to the compressor. The heating unit heats the interior of an automobile by discharging to the interior of the automobile warm air that is produced by heat exchange between air blown by a cooling fan and coolant passing through a heater core, during a process in which the coolant is returned to an engine through the heater core.

These air conditioners may be classified into three types: three-piece type air conditioners each comprised of a blower unit, an evaporator unit and a heater unit, semi-center type air conditioners in which an evaporator unit and a heater unit are integrated into a single body and a blower unit is appended to the single body, and center type air conditioners in which a blower unit, an evaporator unit and a heater unit are integrated into a single body. Currently, the semi-center type air conditioners and the center type air conditioners are generally used because of the advantages of their relatively small installation spaces and relatively simple structures.

Of the air conditioners, a semi-center type air conditioner is described as an example.

As illustrated in FIG. 6, an evaporator 91 is positioned on the upstream side of the interior flow passage of an air conditioner housing 9, while a heater core 92 is positioned on the downstream side of the interior flow passage. A blower casing (not shown) is arranged on the entrance of the air conditioner housing 9, and a blower fan (not shown) operated by a motor (not shown) is arranged in the blower casing. Indoor and outdoor unit suction openings (not shown) are formed on the upper portion of the blower casing. The indoor and outdoor unit suction openings are opened and closed by the operation of doors (not shown). As a result, the air is changed to cool or warm air through heat exchange while passing through the evaporator 91 or heater core 92 in such a way that air flows into the interior of the blower casing by the suction force generated by the rotation of the blowing fan operated by the motor, and flows through the interior passage of the air conditioner housing 9. A defrost vent 93 connected to a defrost duct (not shown) for eliminating frost formed on the windows of an automobile by guiding discharged air to the windows of an automobile, a face vent 94 connected to a vent duct (not shown) for guiding discharged air to the upper portion of the interior of the automobile, and a floor vent 95 connected to a floor duct (not shown) for guiding discharged air to the lower portion of the interior of the automobile are arranged one after another on the exit of the air conditioner housing 9 behind the heater core 92. The vents 93, 94 and 95 can be controllably and selectively opened or closed by doors 931, 941 and 951 according to cooling and heating modes.

Meantime, the heater core 92 is situated to occupy the lower portion of the interior passage of the air conditioner housing 9. A temperature regulating door 96 is positioned in front of the heater core 92 (that is, between the evaporator 91 and the heater core 92) to regulate the degree of opening of a portion of the blowing passage toward the heater core 92 and a portion of the interior passage of the air conditioner housing 9 over the heater core 92. Accordingly, when the temperature regulating door 96 blocks the blowing passage toward the heater core 92, air having passed through the evaporator 91 does not pass through the heater core 92. Instead, the air detours the heater core 92, and is discharged through the open vents of the vents 93, 94 and 95 into the interior of an automobile, thereby cooling the interior of the automobile. On the other hand, when the temperature regulating door 96 blocks the portion of the interior passage of the air conditioner housing 9 over the heater core 92, all air having passed through the evaporator 91 passes through the heater core 92, and is discharged through the open vents of the vents 93, 94 and 95 into the interior of an automobile, thereby heating the interior of the automobile.

However, in the conventional air conditioner, since the temperature regulating door 96 is situated between the evaporator 91 and the heater core 92 and the blowing passage is provided behind the heater core 92 to blow air having passed through the heater core 92 toward the vents 93, 94 and 95, the thickness W1 of the air conditioner housing 9 is increased, resulting in occupation of a great interior space of an automobile. Additionally, the heater core 92 is inserted into the air conditioner housing 9 through one side of the air conditioner housing 9, so a refrigerant supply conduit (not shown) for supplying refrigerant to the heater core 92 and a refrigerant return conduit (not shown) for returning refrigerant discharged from the heater core 92 to an engine (not shown) should be connected to the heater core 92 through a complicated path from one side of the air conditioner housing 9. Accordingly, the installation of the air conditioner on an automobile is difficult due to the occupation of a great exterior space of the air conditioner housing by refrigerant supply and return conduits, manufacturing costs are increased due to employment of long conduits, and the connection of conduits is difficult due to the connection of conduits to the heater core 92 within a narrow space.

The temperature regulating door 96 is shaped in the form of a plate. Accordingly, when air having passed through the evaporator 91 passes through the heater core 92, or detours the heater core 92 and is blown toward the vents 93, 94 and 95, the air collides against the temperature regulating door 96, thereby hindering the air from smoothly flowing to the vents 93, 94 and 95 and causing a backward flow. Accordingly, great noise occurs and the amount of blown air is reduced, so cooling and heating performance is deteriorated.

SUMMARY OF THE INVENTION

Accordingly, the present invention has been made keeping in mind the above problems occurring in the prior art, and an object of the present invention is to provide a compact air conditioner for automobiles, which is capable of reducing its installation space in an automobile, facilitating connection of a refrigerant supply conduit to a heater core, and improving its cooling and heating performance.

In order to accomplish the above object, the present invention provides a compact air conditioner for automobiles, comprising: an evaporator positioned on the upstream side of the interior flow passage of an air conditioner; a heater core positioned on the downstream side of the interior flow passage; a defrost vent selectively opened and closed by a defrost door, and positioned in a mixing chamber that is situated in the exit of the interior flow passage; a face vent opened and closed by a face door; a floor vent divided by a second partition positioned behind the heater core, and selectively opened and closed by a floor door; a first partition positioned between the evaporator and the heater core, and provided with a first blowing opening for allowing air to detour the heater core and a second blowing opening for blowing air to the heater core; a temperature regulating door for regulating the degree of opening of the blowing openings, the temperature regulating door being supported on both sidewalls of the air conditioner housing by its two side support arms; a heater chamber containing the heater core, the heater chamber being defined by the first and second partitions and a pair of side partitions, being open at its bottom and communicating with the second blowing opening; and a pair of side blowing passages formed between each side partition and an interior wall of the air conditioner housing.

The compact air conditioner may further comprise a heater core inserting hole, the heater core inserting hole being formed on a front wall of the air conditioner housing at a position under the evaporator so as to allow the heater core to be removably inserted into the heater chamber.

The refrigerant supply and return conduits may be connected to the heater core through the heater core inserting hole.

The heater core may be horizontally inserted into the heater chamber.

The first partition may be formed to be arcuate, a door plate of the temperature regulating door may be formed to be arcuate correspondingly to the first partition, and a degree of opening of the first and second blowing openings may be selectively regulated according to an angle of rotation of the door plate that is rotated around the support arms.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
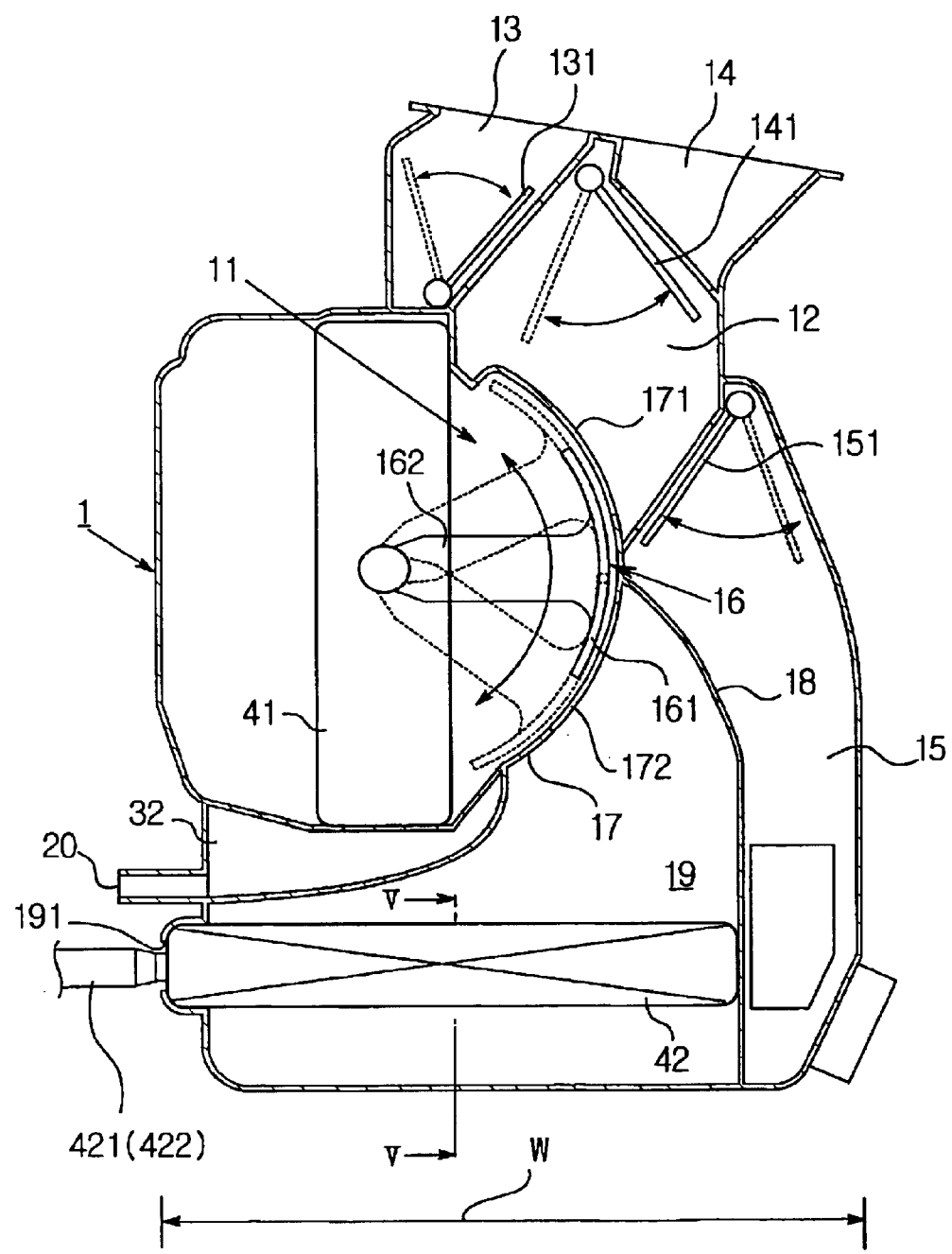
FIG. 1 is a cross section showing a compact air conditioner for automobiles in accordance with the present invention.

Reference now should be made to the drawings, in which the same reference numerals are used throughout the different drawings to designate the same or similar components.

Figure 2:
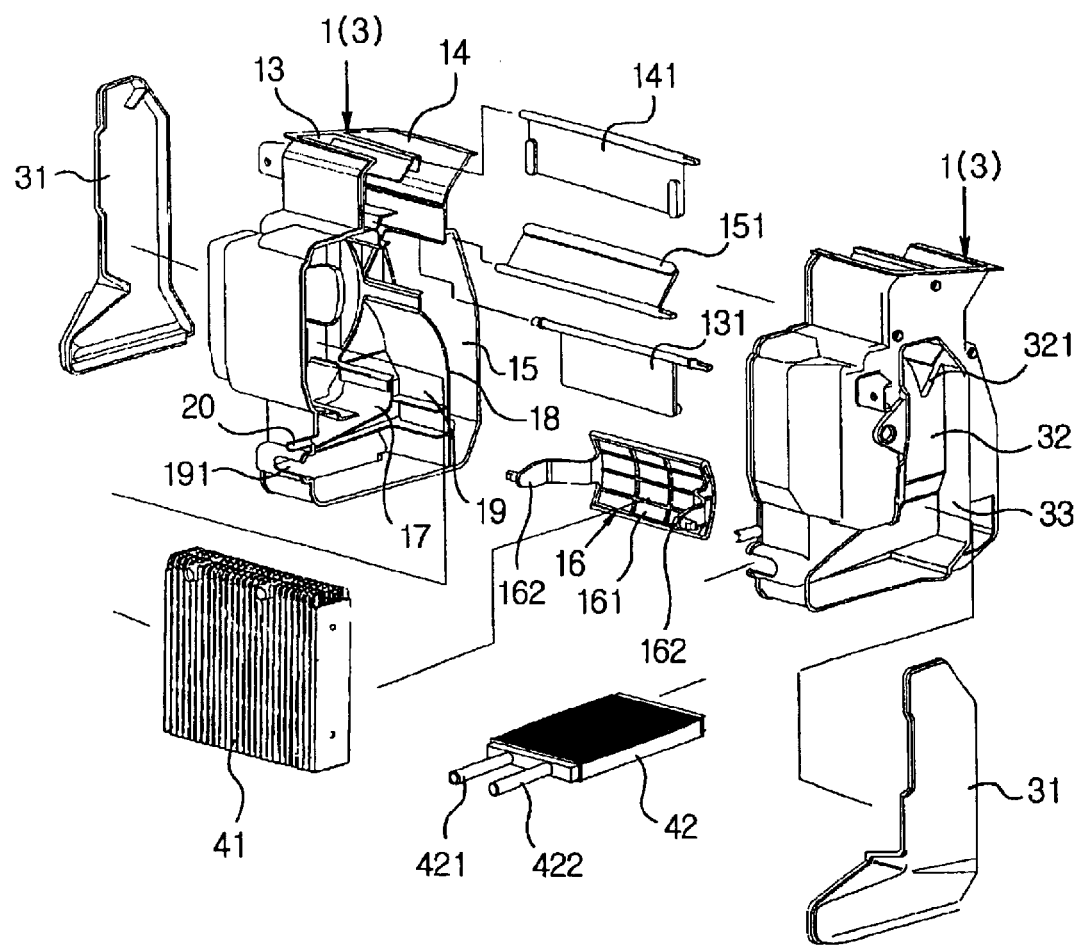
FIG. 2 is an exploded perspective view of the compact air conditioner of the present invention.

As illustrated in FIGS. 1 and 2, reference numeral 1 designates an air conditioner housing. The air conditioner housing 1 is comprised of symmetrical left and right housings 3, and defines an interior flow passage 11. Two covers 31 are removably attached to and cover the sides of the left and right housings 3.

An evaporator 41 is situated on the upstream side of the interior flow passage 11 on which a blower unit (not shown) is mounted, while a heater core 42 is situated on the downstream side of the interior flow passage 11. The exit of the interior passage 11 forms a mixing chamber 12. A defrost vent 13, the degree of opening of which can be regulated by a defrost door 131, a face vent 14, the degree of opening of which can be regulated by a face door 141, and a floor vent 15, the degree of opening of which can be regulated by a floor door 151 are situated in the mixing chamber 12. The defrost vent 13 serves to discharge air to the windows of an automobile, the face door 141 serves to discharge air to the upper portion of the interior of the automobile, and the floor vent 15 serves to discharge air to the floor of the interior of the automobile. Of the three vents 13, 14 and 15, the defrost vent 13 and the face vent 14 are formed on the rear upper portion of the air conditioner housing 1, and the floor vent 15 is separated by a second partition 18 situated behind the heater core 42, thereby taking air into the mixing chamber 12 and discharging air through the rear lower portion of the air conditioner housing 1.

A first partition 17 is formed between the heater core 42 and the evaporator 41 in the interior flow passage 11 of the air conditioner housing 1. A first blowing hole 171 is formed on the upper portion of the first partition 17 to blow air into the mixing chamber 12 without passing through the heater core 42, while a second blowing hole 172 is formed on the lower portion of the first partition 17 to blow air to the heater core 42 and to allow air having passed through the heater core 42 to flow into the mixing chamber 12. The degree of opening of the blowing holes 171 and 172 can be selectively regulated by a temperature regulating door 16 rotatably situated in front of the first partition 17.

According to the present invention, the first partition 17 is preferably arcuate. Accordingly, the door plate 161 of the temperature regulating door 16 is also arcuate. Two support arms 162 attached to both sides of the door plate 161 are rotatably supported on both sidewalls of the air conditioner housing 1 corresponding to both sides of the evaporator 41. The support arms 162 of the temperature regulating door 16 are rotatably supported on both sidewalls of the air conditioner housing 1, so the thickness W of the air conditioner housing 1 can be reduced by the length of each support arm 162 (see FIG. 1).

Figure 5:
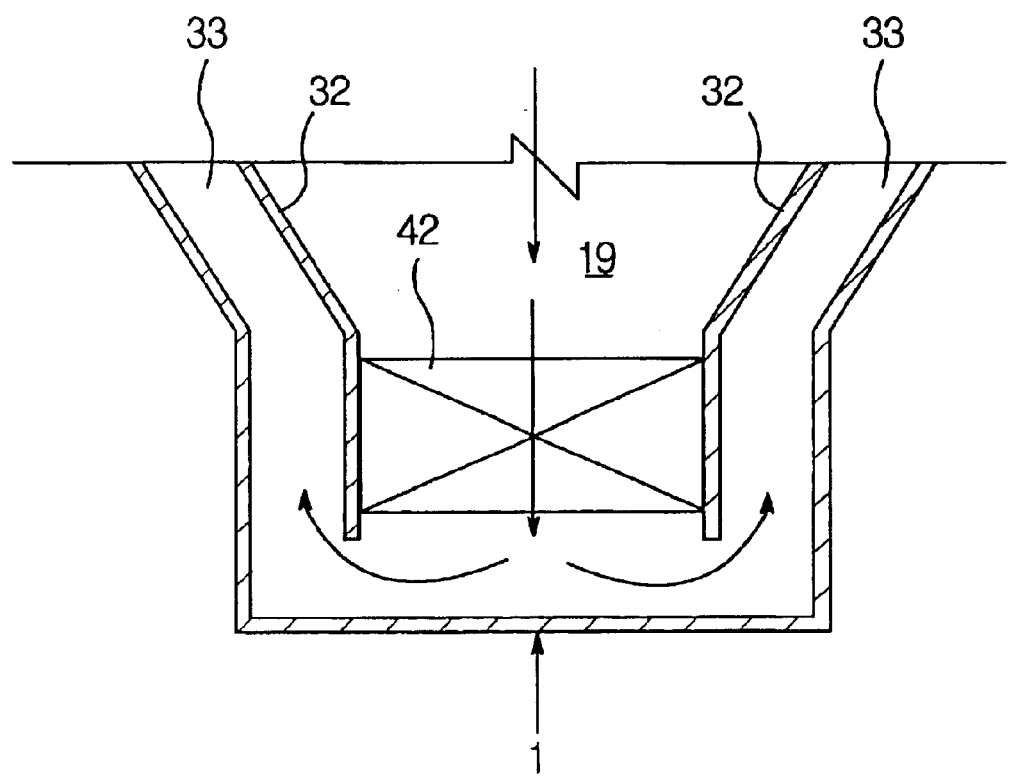
FIG. 5 is a cross section taken along line V—V of FIG. 1.
Figure 6:
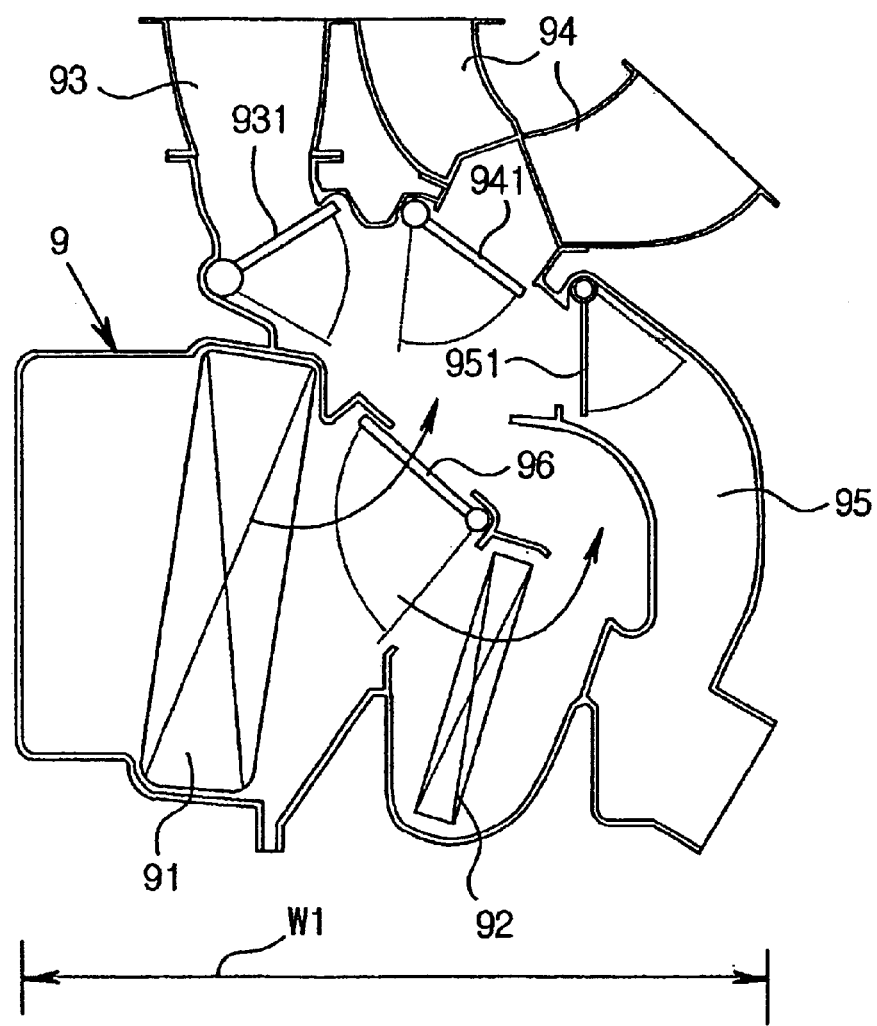
FIG. 6 is a cross section of a conventional air conditioner for automobiles.

In accordance with the present invention, the sides of the first and second partitions 17 and 18 are blocked by a pair of side partitions 32 (see FIG. 5). A heater chamber 19, which is open at its bottom and communicates with the second blowing hole 712, is defined by the four partitions 17, 18 and 32. The heater core 42 is contained in the heater chamber 19. A heater core inserting hole 191 is formed on the front wall of the air conditioner housing 1 at a position under the evaporator 41 to allow the heater core 42 to be removably and horizontally inserted into the heater chamber 19.

As a result, since when the heater core 42 is horizontally inserted into the heater chamber 19 through the heater core inserting hole 191, a portion of the heater core 42 can be situated under the evaporator 41, so a space (the thickness W of the air conditioner housing 1) occupied by the evaporator 41 and the heater core 42 can be reduced by as much as the evaporator 41 and the heater core 42 are overlapped. Additionally, since a refrigerant supply conduit 421 and a refrigerant return conduit 422 can be connected to the heater core 42 through the heater core inserting hole 191, so conduits can be simplified, conduits can be easily connected to one another and a space occupied by the conduits can be reduced.

In addition, a pair of blowing passages 33 (see FIG. 5), which communicate with the heater chamber 19 through the open bottom of the heater chamber 19 and with the mixing chamber 12 through notches 321 formed on the upper end portions of the side partitions 32, are formed by the side partitions 32 defining the heater chamber 19 and the interior walls of the air conditioner housing 1. Accordingly, air having entered the heater chamber 19 passes through the heater core 42, and flows into the mixing chamber 12 through a pair of side blowing passages 33. As a result, air having passed through the heater core 42 does not flow into the mixing chamber 12 through a space behind the heater core 42, but flows into the mixing chamber 12 through spaces beside the heater core 42, so the thickness W of the air conditioner housing 1 can be reduced.

Reference numeral 20 designates a condensed water discharge pipe. The condensed water discharge pipe 20 is formed between the evaporator 41 and the heater core inserting hole 191, and serves to discharge condensed water generated by the evaporator 41.

Hereinafter, the operation of the compact air conditioner for automobiles is described.

Figure 4:
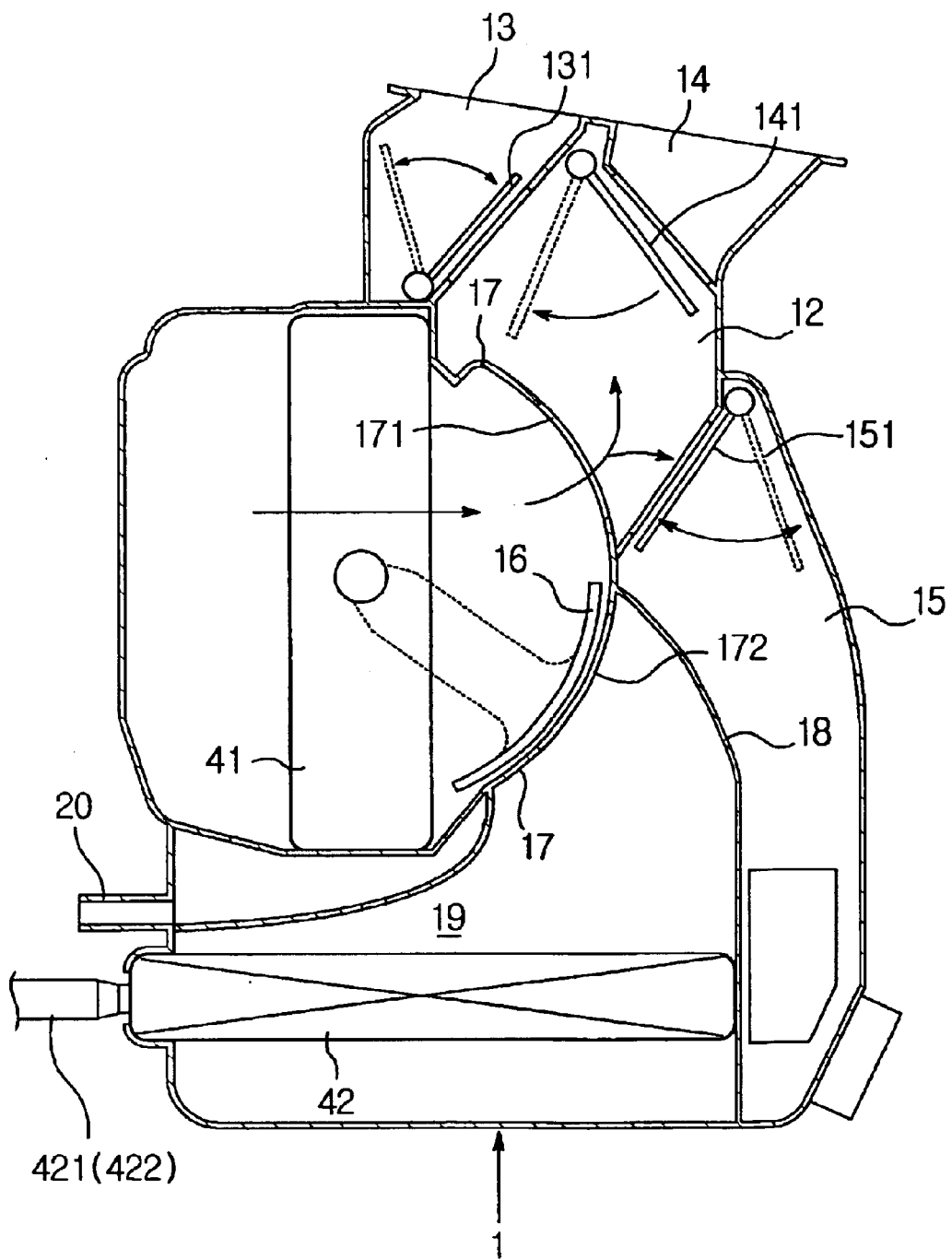
FIG. 4 is a cross section showing air flow in the compact air conditioner of the present invention in a cooling mode.

In a cooling mode, as shown in FIG. 4, the compressor (not shown) and the blower unit (not shown) mounted on the entrance of the air conditioner housing 1 are operated, so exterior or interior air is selectively blown into the interior flow passage 11. After the blown air exchanges heat with the evaporator 41 while passing through the evaporator, the blown air is changed to cold air. At this time, the temperature regulating door 16 is operated to open the first blowing opening 171 and close the second blowing opening 172 at the same time. Accordingly, air having passed through the evaporator 41 does not flow into the heater chamber 19, but directly flows into the mixing chamber 12 through the first blowing opening 171 while detouring around the heater core 42. The air having blown into the mixing chamber 12 is cold because the air has not passed through the heater core 42. The air is discharged into the interior of an automobile through vents that are selectively opened according to air discharge modes, and cools the interior of the automobile.

Figure 3:
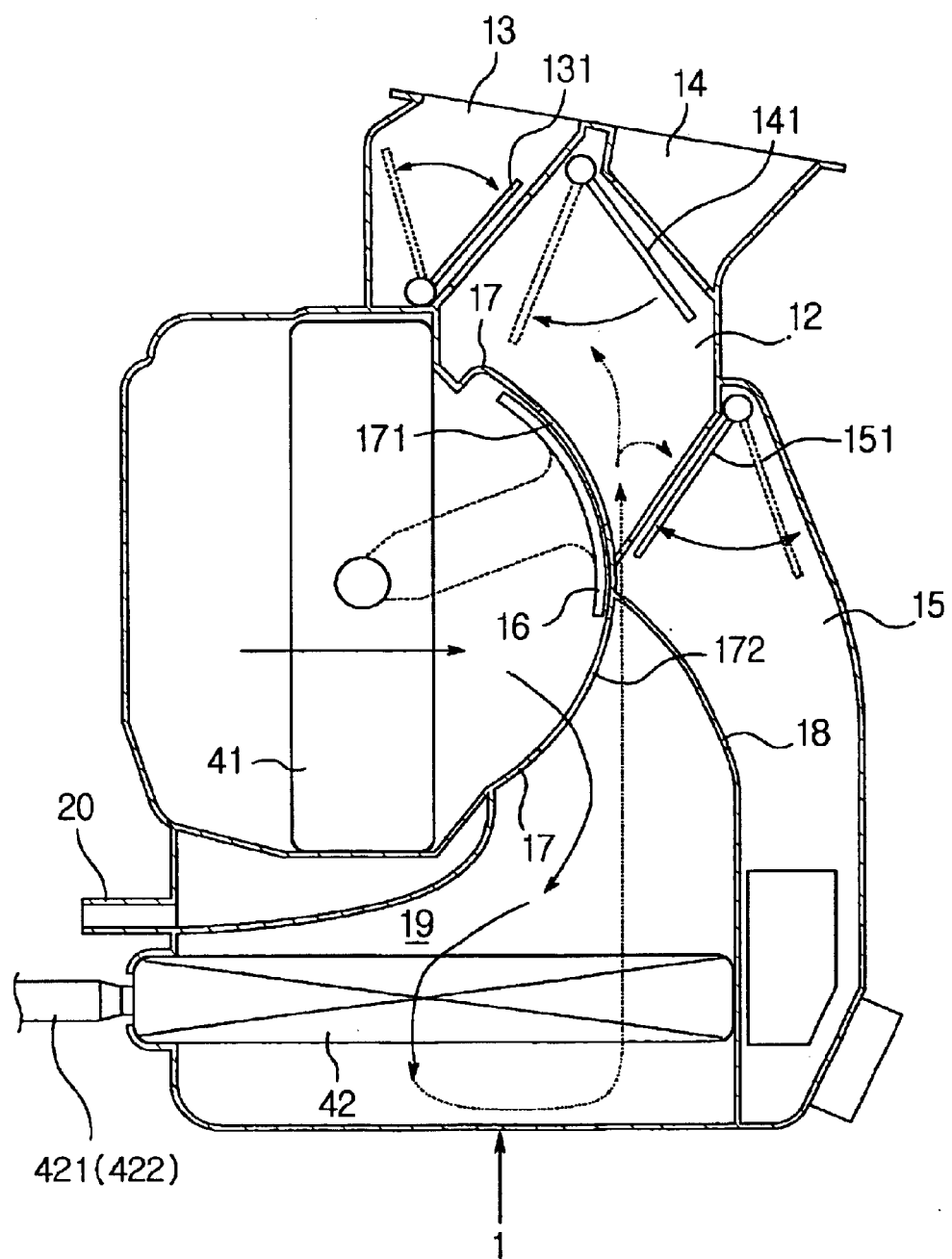
FIG. 3 is a cross section showing air flow in the compact air conditioner of the present invention in a heating mode.

In a heating mode, the blower unit is operated, but the compressor is not operated. As depicted in FIG. 3, the temperature regulating door 16 is operated to close the first blowing opening 171 and open the second blowing opening 172 at the same time. The air blown by the blower unit passes through the evaporator 41 but the compressor is not operated, so the air does not exchange heat and maintains its original state. As shown in FIG. 5, the air having entered the heater chamber 19 is changed to warm air by heat exchange while passing through the heater core 42 and being discharged to the bottom of the heater chamber 19. The warm air having discharged through the bottom of the heater chamber 19 flows to the mixing chamber 12 through the side blowing passages 33. The warm air is discharged into the interior of an automobile through vents that are selectively opened according to air discharge modes, and heats the interior of the automobile.

In a dehumidifying mode, the compressor and the blower unit are operated at the same time. As shown in FIG. 1, as the temperature regulating door 16 is rotated to its neutral position, a portion of the first blowing opening 171 and a portion of the second blowing opening 172 are opened. Accordingly, the air blown by the blower unit is changed to cold air while passing through the evaporator 41. A portion of the cold air flows to the mixing chamber 12 through the first blowing opening 171. On the other hand, the remaining portion of the cold air enters the heating chamber 19 through the second blowing opening 172, passes through the heater core 42 to be dehumidified, flows into the mixing chamber 12 through the side blowing passages 33, and is mixed with the air flowing into the mixing chamber 12 through the first blowing opening 171. The mixed air is discharged to the interior of an automobile through vents that are selectively opened according to air discharge modes, and dehumidifies the air in the interior.

As described above, the present invention provides a compact air conditioner for automobiles, in which the two support arms of its temperature regulating door 16 are supported on the walls of the air conditioner housing 1, so the thickness W of the air conditioner housing 1 is reduced by the length of each support arm.

In addition, its heater core can be horizontally inserted into its heater chamber 19 from a position in front of the air conditioner housing 1, so the heater core 42 is situated under the evaporator 41, thereby reducing the thickness W of the air conditioner housing 1.

In addition, its heater core can be inserted into its heater chamber 19 from a position in front of the air conditioner housing 1, so the refrigerant supply and return conduits can be connected to the heater core 42, thereby facilitating the connection of conduits, simplifying the structure of the conduits and reducing the mounting space of the conduits. Accordingly, the manufacturing efficiency of the air conditioner can be improved, and the costs of the air conditioner can be economized.

The first partition 17 and the temperature regulating door 16 are arcuate, so resistance to the flow of the blown air is reduced, thereby improving the cooling and heating performances of the air conditioner by increasing the amount of air and the pressure of air, reducing noise by the smooth flow of air, and improving the manipulation of the temperature regulating door 16.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A compact air conditioner for automobiles, comprising:
    an evaporator positioned on an upstream side of an interior flow passage of the air conditioner;
    a heater core positioned on a downstream side of said interior flow passage;
    a defrost vent selectively opened and closed by a defrost door, and positioned in a mixing chamber that is situated in an exit of said interior flow passage;
    a face vent opened and closed by a face door;
    a first partition positioned between said evaporator and said heater core, and provided with a first blowing opening for allowing air to bypass said heater core and a second blowing opening for blowing air to said heater core;
    a floor vent separated by a second partition from said heater core, and selectively opened and closed by a floor door;

a temperature regulating door for regulating degrees of opening of said blowing openings, said temperature regulating door being movably supported by walls of a housing of said air conditioner;

a heater chamber containing said heater core, said heater chamber being defined by said first and second partitions and a pair of side partitions, said heater chamber being open at a bottom thereof and communicating with said second blowing opening; and a pair of side blowing passages each being formed between one of said side partitions and an interior wall of said housing of said air conditioner.

2. The compact air conditioner according to claim 1, further comprising a heater core inserting hole, said heater core inserting hole being formed on a front wall of said air conditioner housing at a position under said evaporator so as to allow said heater core to be removably inserted into said heater chamber.

3. The compact air conditioner according to claim 2, wherein said heater core is horizontally disposed in said heater chamber.

4. The compact air conditioner according to claim 2, wherein said refrigerant supply and return conduits are connected to said heater core through said heater core inserting hole.

5. The compact air conditioner according to claim 4, wherein said heater core is horizontally disposed in said heater chamber.

6. The compact air conditioner according to claim 1, wherein said first partition is arcuate, said temperature regulating door being arcuate and having a curvature corresponding to that of said first partition; and said temperature regulating door is rotatably supported by the walls of said housing so that the degrees of opening of said first and second blowing openings are selectively regulated according to an angle of rotation of said temperature regulating door.

\* \* \* \* \*